Figure 1:
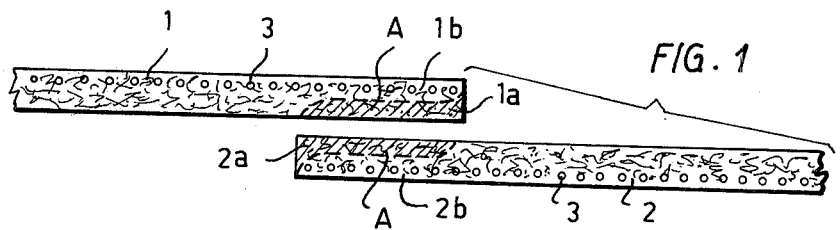

United States Patent [19]

Servo et al.

[11] 4,435,457
[45] Mar. 6, 1984

[54] THERMOPLASTIC NON-WOVEN FABRIC SEAMED BY MELT-SEAMING AND A METHOD OF MAKING SUCH A FABRIC

[75] Inventors: Matti Servo; Matti Vainio, both of Tampere, Finland

[73] Assignee: Tamfelt Oy Ab, Tampere, Finland

[21] Appl. No.: 417,135

[22] PCT Filed: Jan. 6, 1982

[86] PCT No.: PCT/FI82/00001
§ 371 Date: Sep. 13, 1982
§ 102(e) Date: Sep. 13, 1982

[87] PCT Pub. No.: WO82/02412
PCT Pub. Date: Jul. 22, 1982

[30] Foreign Application Priority Data

Jan. 15, 1981 [FI] Finland ................... 810104

[51] Int. Cl.³ ................... C09J 5/10; D06H 5/00
[52] U.S. Cl. ................... 428/58; 156/304.1; 156/304.3; 428/60; 428/192; 428/294; 428/295
[58] Field of Search ................... 428/58, 60, 192, 294, 428/295; 156/304.1, 304.3, 156, 285

[56] References Cited
U.S. PATENT DOCUMENTS
4,390,384  6/1983  Turner ................... 428/58

Primary Examiner—Marion McCamish
Attorney, Agent, or Firm—Frost & Jacobs

[57] ABSTRACT

A seamed non-woven fabric consisting of at least two thermoplastic non-woven fabric strips (1, 2) positioned side by side in the same plane, said strips of fabric being joined together at their opposite longitudinal edges by means of a melt seam. The edges of the strips to be joined together have been melt-shrunk into such a thickness that the thickness of the seam (4) formed by the joined edge portions (1b, 2b) of the strips does not exceed the thickness of the other portions of the strips. The strips of fabric are, at least at the edges to be joined together, provided with reinforcement yarns (3) parallel to said edges, the melting point of said yarns being higher than the melting temperature used during the melt-seaming. The reinforcement yarns provide in the seam a high strength in the longitudinal direction in spite of the melting of the edge portions of the strips. In the method of making such a non-woven fabric the edge portions of the strips of fabric are heated to a melting temperature, which is higher than the melting point of the fibrous material of the strips of fabric but lower than the melting point of the reinforcement yarns, whereupon the melt-shrunk edges of the strips are pressed together to make a seam having the same thickness as the other portions of the strips.

6 Claims, 11 Drawing Figures

THERMOPLASTIC NON-WOVEN FABRIC SEAMED BY MELT-SEAMING AND A METHOD OF MAKING SUCH A FABRIC

The present invention relates to a non-woven fabric made of a thermoplastic material and seamed by means of melt-seaming, said fabric consisting of at least two strips of fabric positioned side by side in the same plane and joined to each other at their opposite overlapping edges by means of a melt seam.

When needled non-woven fabrics are manufactured, the narrowness of the production line often imposes restrictions on the use of the fabrics. A sufficient width is required, e.g., from a felt carpet intended for covering of a floor. Likewise, when a needled filter fabric is used, some objects may require a wider fabric than what can be produced without seaming. An ordinary width of a carding frame is 2 to 2.5 meters. In the objects mentioned above, a mat of a width of at least 5 meters is often required.

In prior art it is known to use a hot-melting material between the fabric strips when joining the strips firmly together. The material to be melted may be placed between the fabric strips in different forms. For example, it may be a plastic strip, a hot-melting yarn, or a powdery resin which glues the strips together when melting. The material may also be applied as a solution onto the surfaces to be joined together, in which case the material, when drying, forms a surface which melts by heating and glues the surfaces together.

The above melting methods can be used for joining two or more strips of fabric together. However, it is a disadvantage of these methods that it is necessary to use a separate melting layer of material in the seam, which makes the seaming more difficult. Another, maybe more important drawback is the thickness of the seam, because the seam portion always consists of two strips of fabric placed one upon the other. When the fabric seamed in this way is wound to form a roll, a thicker section is of course formed in the roll at the place of the seam, this thicker section being the thicker, as compared with the rest of the roll, the more fabric has been wound onto the roll. A thicker section on the roll makes its handling more difficult. Such a roll also has an ugly appearance, which is of importance for the competitive quality of the product.

If the material to be joined together is in itself thermoplastic, the seaming can of course be performed without a melting glue by partly melting the surfaces to be joined together, e.g. by means of a gas flame, and by pressing the surfaces together. This method also involves the same drawback as the earlier ones, because the seam section becomes thicker than the surrounding fabric.

Previously, attempts have been made to solve said problem so that the fabrics are melted together end edge against end edge (e.g. Swedish patent application 7401293-1), in wich case the seam portion does not become thicker than the rest of the fabric. A problem is in said method, however, created by the thickness of the fabric. In order that the seam made by means of said method should be durable, it ought to have an adequate surface area at the edges of the fabrics. This again requires a thick fabric. This method is not usable for thin fabrics, because in such a case a sufficient molted surface is not obtained to keep the seam together.

The object of the present invention is to provide a non-woven fabric joined together by seaming and eliminating the above drawbacks and wherein the seam portion produced by melt-seaming is not thicker than the other portions of the joined strips of fabric. This object is achieved by means of a non-woven fabric in accordance with the present invention, which is characterized in that the strips of fabric to be joined together are, at least at the edges to be joined together, provided with reinforcement yarns parallel to said edges and having a melting point higher than the melting point of the rest of the material of the fabric strips and that said edges to be joined together have by means of melting been shrunk into such a thickness that the thickness of the seam formed by said edges is substantially equal to the thickness of the strips of fabric.

The invention is based on the idea that the melting is not restricted to partial melting of the surface of the strips of fabric only, but the melting is extended right into the fabric. The object is to convert a maximum quantity of material into molten form, whereby it shrinks. Owing to the shrinkage, as well as by means of rapid pressing as the material is still in the molten state, the thickness of the seam can be reduced singnificantly so that the seam formed is equally thick as the surrounding fabric.

Normally, such an extensive melting of a non-woven fabric weakens the fabric to such an extent that the ultimate seam becomes too fragile. Owing to the reinforcement yarns included in the strips of fabric, the strips of fabric can, however, be melted strongly without significant reduction in the strength of the fabric in its longitudinal direction. Owing to the higher melting point of the longitudinal reinforcement yarns, the reinforcement yarns do not melt at the temperature at which the melting of the fabrics to be joined together takes place. If, for example, polypropene, polyamide or polyester is used as the raw-material of the non-woven fabric, the reinforcement yarns may be, e.g., of polytetrafluoroethane (Teflon), which melts at a considerably higher temperature than said materials do. Such reinforcement yarns may be monofilament or multifilament yarns or spun yarns, with a spacing of 2 to 12 yarns per centimeter.

The invention also relates to a method of making a novel seamed non-woven fabric of the type described above, and this method is characterized in that the strips of fabric are reinforced at least at the edges to be joined together by means of reinforcement yarns parallel to said edges, the melting point of said reinforcement yarns being higher than the melting point of the other material of the strips of fabric, that said edges are melted in order to cause the material of the strips of fabric to shrink due to said melting to such an extent that the thickness of each said edge is reduced to about one half of the original thickness of the fabric, that the melting temperature is maintained lower than the melting point of the reinforcement yarns but higher than the melting point of the other material of the strips of fabric, and that the shrunk edges of the strips of fabric are hereupon guided to be positioned with their molten surfaces against each other.

The method is based on the idea that, when the strips of fabric to be joined together are provided with reinforcement yarns in their longitudinal direction as relatively densely spaced, the portion of the seam can be shaped by means of efficient melting so that, despite the strips of fabric to be joined being placed one on top of the other, the thickness of the strips is reduced during the seaming to such an extent that the seam portion is substantially equally thick as the rest of the fabric. The invention is applied to needled non-woven type fabrics, felt or mats.

Figure 2:
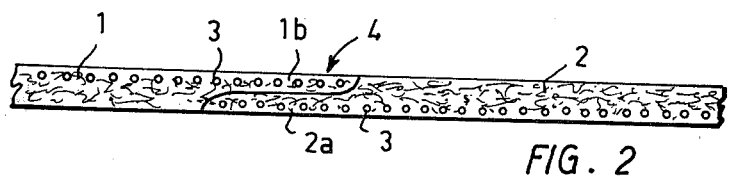
Figure 3:
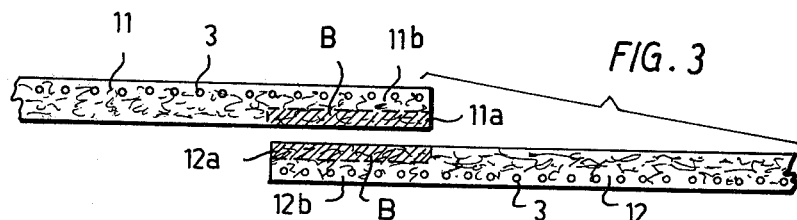
Figure 4:
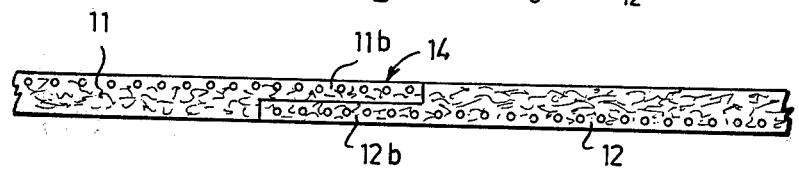
Figure 5:
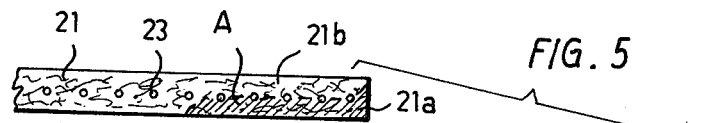
Figure 6:
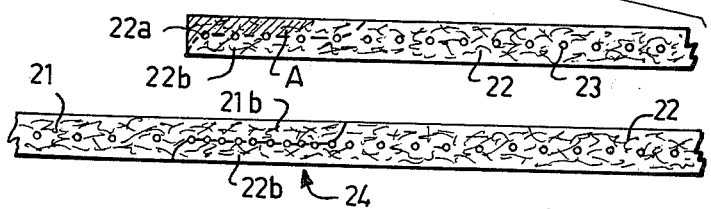
Figure 7:
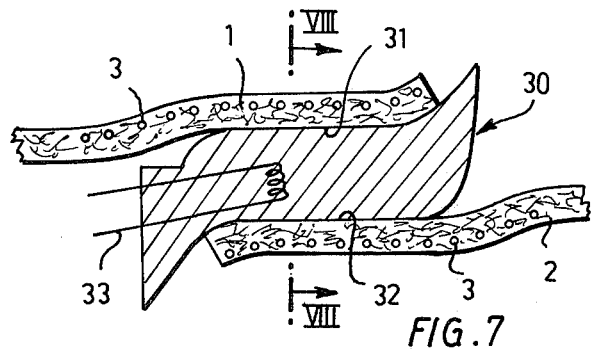
Figure 8:
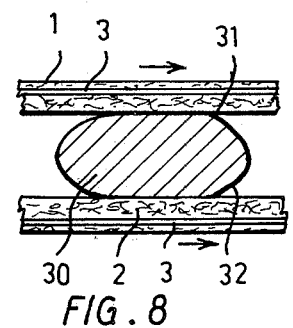
Figure 9:
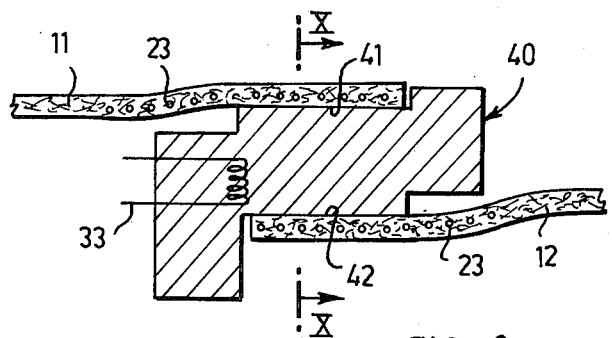
Figure 10:
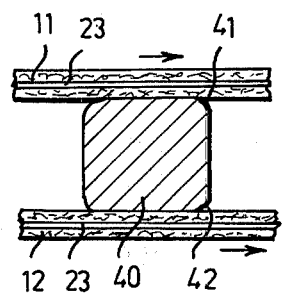
Figure 11:
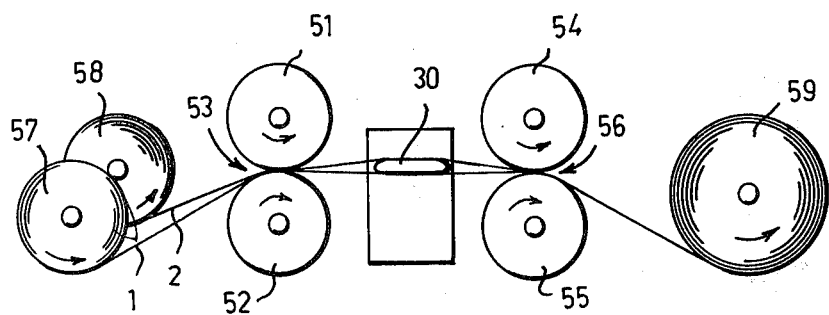

The invention will be described in more detail below with reference to the attached drawings, wherein FIGS. 1 and 2 are schematical sectional views of a non-woven fabric in accordance with the invention made of two strips of fabric, before seaming and after seaming, respectively, FIGS. 3 and 4 illustrate a second embodiment of a seamed non-woven fabric in accordance with the invention, FIGS. 5 and 6 illustrate a third embodiment of a seamed non-woven fabric in accordance with the invention, FIGS. 7 and 8 illustrate the melting device to be used for seaming of the fabrics shown in FIGS. 1 and 2 and in FIGS. 5 and 6 as a sectional view perpendicular to the non-woven fabric webs, and as longitudinal section along line VIII—VIII in FIG. 7, respectively, FIGS. 9 and 10 illustrate the melting device to be used for seaming of the fabric shown in FIGS. 3 and 4 as a sectional view perpendicular to the non-woven fabric webs, and as a longitudinal section along line X in FIG. 9, and FIG. 11 is a schematical side view of an equipment for carrying out the method in accordance with the invention.

The seamed non-woven fabric shown in FIG. 2 comprises two fabric strips 1, 2, e.g. of needled thermoplastic fibrous material and provided with longitudinal reinforcement yarns 3 located in the strips adjacent the strip surfaces facing away from each other, i.e. in the upper surface of strip 1 and in the bottom surface of strip 2. The longitudinal edge portions to be joined together of the two strips have been heated by means of the melting device (which is described in more detail in connection with FIGS. 7 to 10) to a temperature higher than the melting temperature of the fibrous material of the fabric strips but lower than the melting point of the reinforcement yarns. As a result of this heating, the fibrous material of the strips melts and shrinks, whereby the new contour of the strips at the edge zones corresponds to the broken lines A. The contour is at the ends slightly curved and at the middle portion horizontal. In this way it has been possible to shrink away the superfluous edge portions 1a, 2a of the strips of fabric (shown in FIG. 1 by means of diagonal shading) by means of heating, so that the thickness of the edge of each strip has been reduced to about one half. Hereupon the melt-shrunk edge portions 1b and 2b, respectively, are guided so as to be positioned one above the other and the seam portion are pressed together strongly while the fibrous material is still in molten state, so that the thickness of the seam 4 produced becomes the same as the thickness of a single strip of fabric.

The embodiment shown in FIGS. 3 and 4 differs from the above only in the respect that the surface of the melt-shrunk edge portions 11b, 12b of the strips of fabric 11, 12 is angular, as is shown by means of the broken line B. In this case as well, the seam 14 produced in the united fabric is equally thick as the thickness of a single strip of fabric.

The embodiment shown in FIGS. 5 and 6 differs from those described above only in the respect that the reinforcement yarns 23 of the strips of fabric 21, 22 are placed in the middle of the strips. In this case, the superfluous edge portion 21a or 22a, respectively, of each strip, to be melt-shrunk, extends to the reinforcement yarns so that the reinforcement yarns penetrate between each other when the melt-shrunk edge portions 21b, 22b are pressed together to form a seam 24.

FIGS. 7 and 8 schematically illustrate a melting device 30 for making the seams 4 and 24 shown in FIGS. 1 and 2, and 5 and 6, respectively. The melting device is provided with an upper melting surface 31 having the contour A in the longitudinal direction of the strip to be melted, and a lower melting surface 32 of corresponding shape, the inlet and outlet edges of said faces being rounded. One of the strips of fabric is guided so that the bottom surface of its edge portion slides along the upper melting surface of the melting device, and the other strip of fabric is guided so that the upper surface of its edge portion slides along the lower melting surface of the melting device.

The melting device is made of a highly heat-conductive material, e.g. brass, and it is provided with resistance wires 33 for electrical heating.

FIGS. 9 and 10 illustrate a melting device 40 for making the seam 14 shown in FIGS. 3 and 4. The melting device has an upper melting surface 41 and a lower melting surface 42 corresponding the contour B of the edge portions of the strips to be joined together.

FIG. 11 schematically illustrates an equipment for carrying out the method according to the invention. The equipment comprises two compression rollers 51, 52, forming a first press nip 53, and two compression rollers 54, 55 spaced from the first nip and forming a second press nip 56. Between the press nips, a melting device 30 is mounted at the level of the nips.

The strips of fabric 1, 2 to be joined together are guided from rolls 57, 58 through the first press nip and at opposite sides of the melting device and through the second press nip and are finally wound onto a common roll 59. The strips are guided through the press nips so that their edges to be joined together are positioned overlapping at the width of the desired seam, e.g. in the way shown in FIG. 7. The press nips keep the strips tensioned and tightly pressed against the heated surfaces of the melting device. When the edges have passed the melting device and been molten and shrunk, they are immediately pressed in contact with each other in the latter nip. As the seam portion does not become thicker than the rest of the fabric material, larger quantities of fabric may also be wound onto the same roll. Nevertheless, the roll maintains a uniform thickness.

The drawings and the related description are only supposed to illustrate the idea of the invention. In its details, the united non-woven fabric in accordance with the invention may vary within the scope of the patent claims.

What is claimed is:

1. A non-woven fabric made of a thermoplastic material and seamed by means of melt-seaming, the said fabric consisting of at least two strips of fabric (1, 2; 11, 12; 21, 22) positioned side by side in the same plane and joined to each other at their opposite overlapping edges by means of a melt seam (4; 14; 24), characterized in that the strips of fabric (1, 2; 11, 12; 21, 22) to be joined together are, at least at the edges (1b, 2b; 11b, 12b; 21b, 22b) to be joined together, provided with reinforcement yarns (3; 23) parallel to said edges and having a melting point higher than the melting point of the rest of the material of the fabric strips and that said edges to be joined together have by means of melting been shrunk into such a thickness that the thickness of the seam formed by said edges is substantially equal to the thickness of the strips of fabric.

2. A non-woven fabric as claimed in claim 1, characterized in that the reinforcement yarns (3) are positioned close to the surfaces of the fabric strips (1, 2; 11, 12) facing away from each other.

3. A non-woven fabric as claimed in claim 1, characterized in that the reinforcement yarns (23) are positioned substantially in the center planes of the strips of fabric (21, 22).

4. A non-woven fabric as claimed in claim 1, characterized in that the reinforcement yarns (3; 23) are monofilament of multifilament or spun yarns.

5. A method of seaming a non-woven fabric made of a thermoplastic material as claimed in claim 1, said fabric consisting of at least two strips of fabric (1, 2; 11, 12; 21, 22) positioned side by side in the same plane and joined to each other at their opposite overlapping edges by means of a melt seam (4; 14; 24), characterized in that the strips of fabric (1, 2; 11, 12; 21, 22) are reinforced at least at the edges to be joined together by means of reinforcement yarns (3; 23) parallel to said edges, the melting point of said reinforcement yarns being higher than the melting point of the other material of the strips of fabric, that said edges are melted in order to cause the material (1a, 2a; 11a, 12a; 21a, 22a) of the strips of fabric to shrink due to said melting to such an extent that the thickness of each said edge (1b, 2b; 11b, 12b; 21b, 22b) is reduced to about one half of the original thickness of the fabric, that the melting temperature is maintained lower than the melting point of the reinforcement yarns but higher than the melting point of the other material of the strips of fabric, and that the shrunk edges of the strips of fabric are hereupon guided to be positioned with their molten surfaces against each other.

6. A method as claimed in claim 5, characterized in that the seam (4; 14; 24) between the strips of fabric is compressed after said edges are positioned against each other.

* * * * *